(12) United States Patent
O'Brien et al.

(10) Patent No.: US 11,197,597 B2
(45) Date of Patent: Dec. 14, 2021

(54) SYSTEM AND METHOD FOR A TASK MANAGEMENT AND COMMUNICATION SYSTEM

(71) Applicant: Walmart Apollo, LLC, Bentonville, AR (US)

(72) Inventors: John J. O'Brien, Farmington, AR (US); Donald R. High, Noel, MO (US); Brian McHale, Oldham (GB)

(73) Assignee: Walmart Apollo, LLC, Bentonville, AR (US)

( * ) Notice: Subject to any disclaimer, the term of this patent is extended or adjusted under 35 U.S.C. 154(b) by 253 days.

(21) Appl. No.: 16/451,161

(22) Filed: Jun. 25, 2019

(65) Prior Publication Data
US 2019/0387944 A1  Dec. 26, 2019

Related U.S. Application Data

(60) Provisional application No. 62/689,618, filed on Jun. 25, 2018.

(51) Int. Cl.
*A47L 11/40* (2006.01)
*G05D 1/00* (2006.01)
(Continued)

(52) U.S. Cl.
CPC .......... *A47L 11/4011* (2013.01); *A47L 5/22* (2013.01); *A47L 11/28* (2013.01); *G05D 1/0022* (2013.01);
(Continued)

(58) Field of Classification Search
CPC ........ A47L 11/4011; A47L 5/22; A47L 11/28; A47L 2201/06; A47L 11/24; A47L 2201/04; A47L 9/2857; A47L 9/2852; A47L 9/2894; G05D 1/0088; G05D 1/0217; G05D 1/0022; G05D 2201/0203; G05D 2201/0215; G05D 1/0297; G05D 1/00; G05D 1/0219; G05D 1/0212; G05D 1/0268; G05D 1/0274; H04W 4/44; H04W 4/029; G06Q 10/06312
See application file for complete search history.

(56) References Cited

U.S. PATENT DOCUMENTS 5,367,456 A * 11/1994 Summerville ....... G05D 1/0297
701/24
9,519,880 B1 * 12/2016 Cohn .................... H04W 16/20
(Continued)

OTHER PUBLICATIONS

International Search Report and Written Opinion dated Sep. 19, 2019, issued in corresponding PCT Application No. PCT/US2019/038929.

*Primary Examiner* — Yonel Beaulieu
(74) *Attorney, Agent, or Firm* — Duane Morris LLP; Manita Rawat

(57) ABSTRACT

Systems, methods, and computer-readable storage media for a task management and distribution system. Systems configured as disclosed manage task distribution between various robots, drones, and autonomous vehicles. As tasks are identified as not capable of completion by the detecting robot, they are transmitted to a central task-management system which identifies a subset of robots which are capable of completing the task, determines the availability of the robots in the subset, and assigns one of those robots in the subset to complete the task.

20 Claims, 5 Drawing Sheets

(51) Int. Cl.
*G05D 1/02* (2020.01)
*A47L 11/28* (2006.01)
*H04W 4/44* (2018.01)
*A47L 5/22* (2006.01)
*A47L 11/24* (2006.01)

(52) U.S. Cl.
CPC ......... *G05D 1/0088* (2013.01); *G05D 1/0217* (2013.01); *H04W 4/44* (2018.02); *A47L 11/24* (2013.01); *A47L 2201/04* (2013.01); *A47L 2201/06* (2013.01); *G05D 2201/0203* (2013.01); *G05D 2201/0215* (2013.01)

(56) References Cited

U.S. PATENT DOCUMENTS

| | | | |
|---|---|---|---|
| 9,547,311 B2* | 1/2017 | Tamir | G05D 1/0088 |
| 10,366,366 B1* | 7/2019 | Wellman | G05D 1/0027 |
| 10,698,409 B1* | 6/2020 | Siegel | G05D 1/0022 |
| 10,726,387 B2* | 7/2020 | Shydo, Jr. | G05D 1/0291 |
| 10,852,745 B2* | 12/2020 | Jeon | G05D 1/0289 |
| 10,926,410 B2* | 2/2021 | Lalonde | B25J 9/1666 |
| 2015/0051783 A1* | 2/2015 | Tamir | G05D 1/0088 |
| | | | 701/25 |
| 2017/0148075 A1 | 5/2017 | High et al. | |
| 2017/0148316 A1* | 5/2017 | Curlander | G01C 21/362 |
| 2017/0282371 A1 | 10/2017 | Erhart et al. | |
| 2017/0308096 A1* | 10/2017 | Nusser | G05D 1/0287 |
| 2018/0129201 A1* | 5/2018 | Douglas | G05D 1/0027 |
| 2018/0300835 A1* | 10/2018 | Saboo | B25J 9/1661 |
| 2019/0018427 A1* | 1/2019 | Jeon | G05D 1/0274 |
| 2019/0025818 A1* | 1/2019 | Mattingly | G05D 1/0027 |
| 2019/0049975 A1* | 2/2019 | Kattepur | G06Q 10/087 |
| 2019/0172005 A1* | 6/2019 | Shydo, Jr. | G05D 1/104 |
| 2019/0205842 A1* | 7/2019 | Starns | B60L 53/65 |
| 2019/0354106 A1* | 11/2019 | Gupta | G05D 1/0219 |
| 2020/0133286 A1* | 4/2020 | Bellar | B60L 53/80 |
| 2020/0272154 A1* | 8/2020 | Bearup | A47L 11/4008 |

* cited by examiner

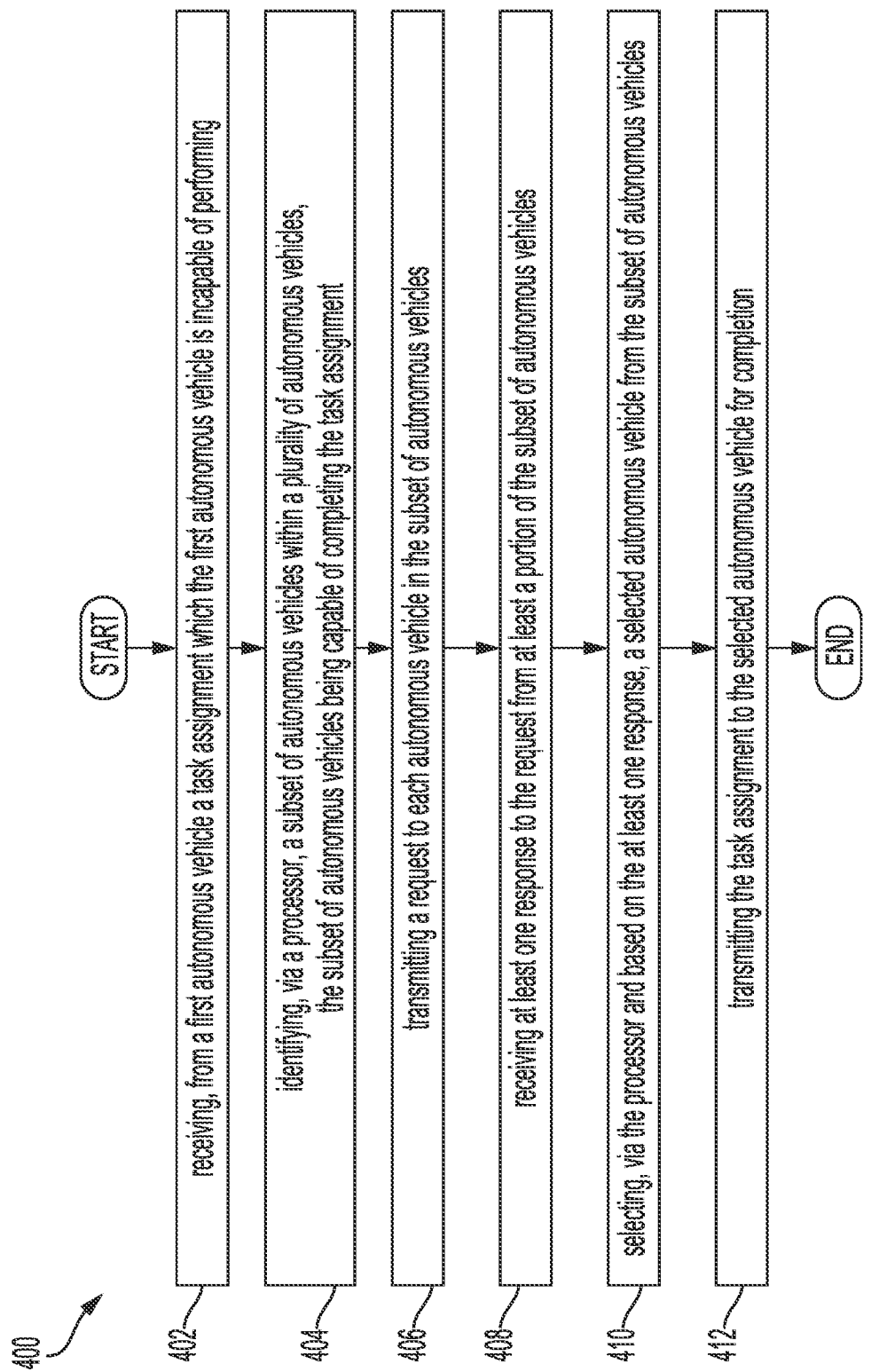

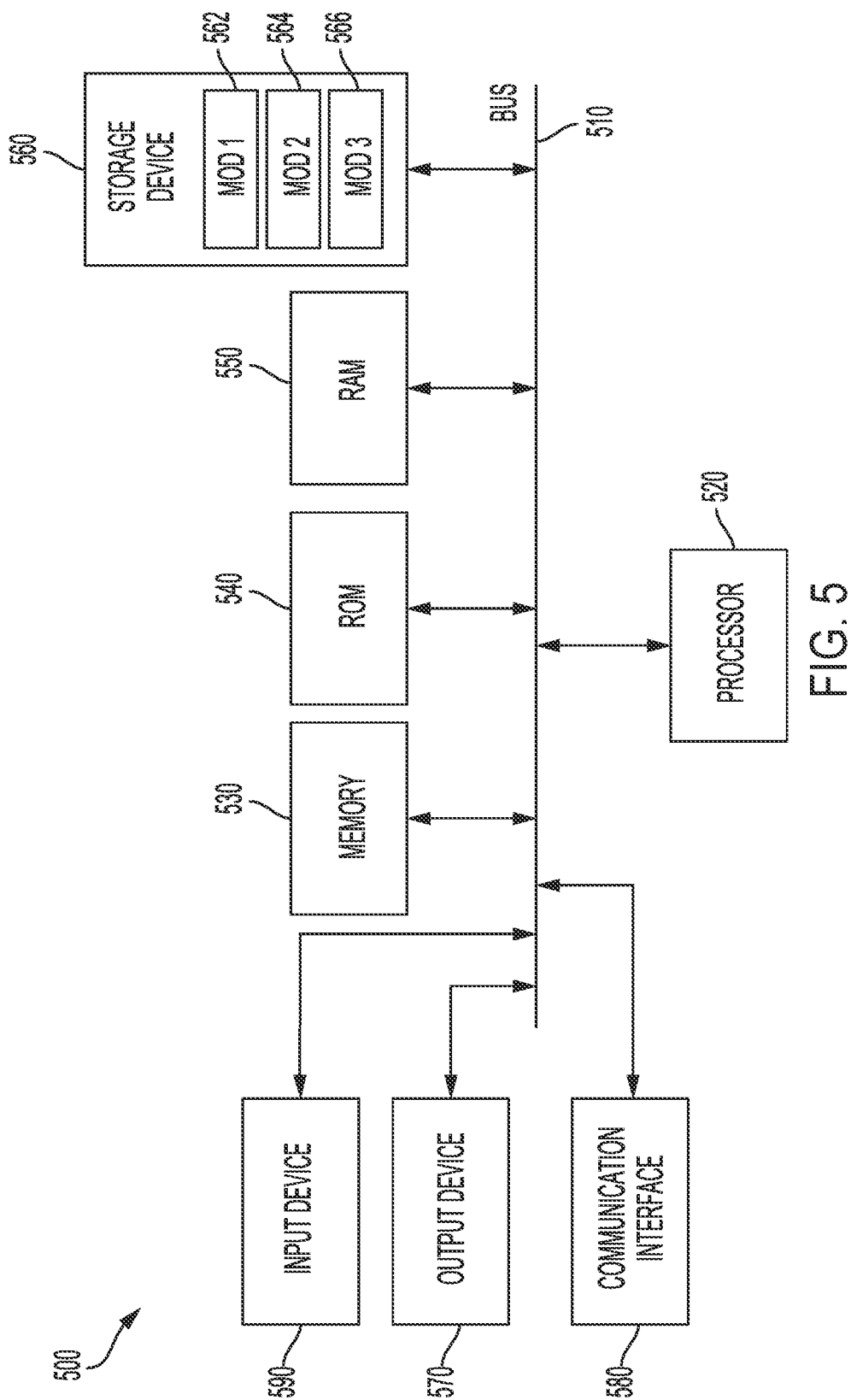

SYSTEM AND METHOD FOR A TASK MANAGEMENT AND COMMUNICATION SYSTEM

CROSS REFERENCE TO RELATED APPLICATIONS

This present Patent Application claims priority benefit from U.S. Provisional Patent Application No. 62/689,618 filed on Jun. 25, 2018, the entire content of which is hereby incorporated herein by reference.

BACKGROUND

1. Technical Field

The present disclosure relates to a task management and communication system, and more specifically to tasking autonomous vehicles to perform tasks identified by other autonomous vehicles when the detecting vehicles are incapable of performing the tasks.

2. Introduction

Robots, drones, and other autonomous vehicles are becoming more and more prevalent in society. However, because no single robot, drone, or autonomous vehicle can replicate the actions of a sentient human being, the robots, drones, and autonomous vehicles are specialized to perform specific tasks or actions. For example, a drone may be designed and built for the express purpose of delivering groceries to a customer's home, but may be incapable of retrieving those goods within a warehouse. Similarly, a store robot tasked with verifying current shelf inventories may be capable of detecting a spill within the aisle, but be incapable of cleaning the spill itself.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

An example method configured according to this disclosure can include: receiving, from a first autonomous vehicle a task assignment which the first autonomous vehicle is incapable of performing; identifying, via a processor, a subset of autonomous vehicles within a plurality of autonomous vehicles, the subset of autonomous vehicles being capable of completing the task assignment; transmitting a request to each autonomous vehicle in the subset of autonomous vehicles; receiving at least one response to the request from at least a portion of the subset of autonomous vehicles; selecting, via the processor and based on the at least one response, a selected autonomous vehicle from the subset of autonomous vehicles; and transmitting the task assignment to the selected autonomous vehicle for completion.

An example system configured according to this disclosure can include: a processor; and a computer-readable storage medium having instructions stored which, when executed by the processor, cause the processor to perform operations comprising: receiving, from a first autonomous vehicle a task assignment which the first autonomous vehicle is incapable of performing; identifying a subset of autonomous vehicles within a plurality of autonomous vehicles, the subset of autonomous vehicles being capable of completing the task assignment; transmitting a request to each autonomous vehicle in the subset of autonomous vehicles; receiving at least one response to the request from at least a portion of the subset of autonomous vehicles; selecting, based on the at least one response, a selected autonomous vehicle from the subset of autonomous vehicles; and transmitting the task assignment to the selected autonomous vehicle for completion.

A non-transitory computer-readable storage medium configured according to this disclosure can have instructions stored which, when executed by a computing device, cause the computing device to perform operations which include: receiving, from a first autonomous vehicle a task assignment which the first autonomous vehicle is incapable of performing; identifying a subset of autonomous vehicles within a plurality of autonomous vehicles, the subset of autonomous vehicles being capable of completing the task assignment; transmitting a request to each autonomous vehicle in the subset of autonomous vehicles; receiving at least one response to the request from at least a portion of the subset of autonomous vehicles; selecting, based on the at least one response, a selected autonomous vehicle from the subset of autonomous vehicles; and transmitting the task assignment to the selected autonomous vehicle for completion.

BRIEF DESCRIPTION OF THE DRAWINGS

FIG. 4 illustrates an exemplary method embodiment of the present invention; and

FIG. 5 illustrates an exemplary computer system.

DETAILED DESCRIPTION

Figure 1:
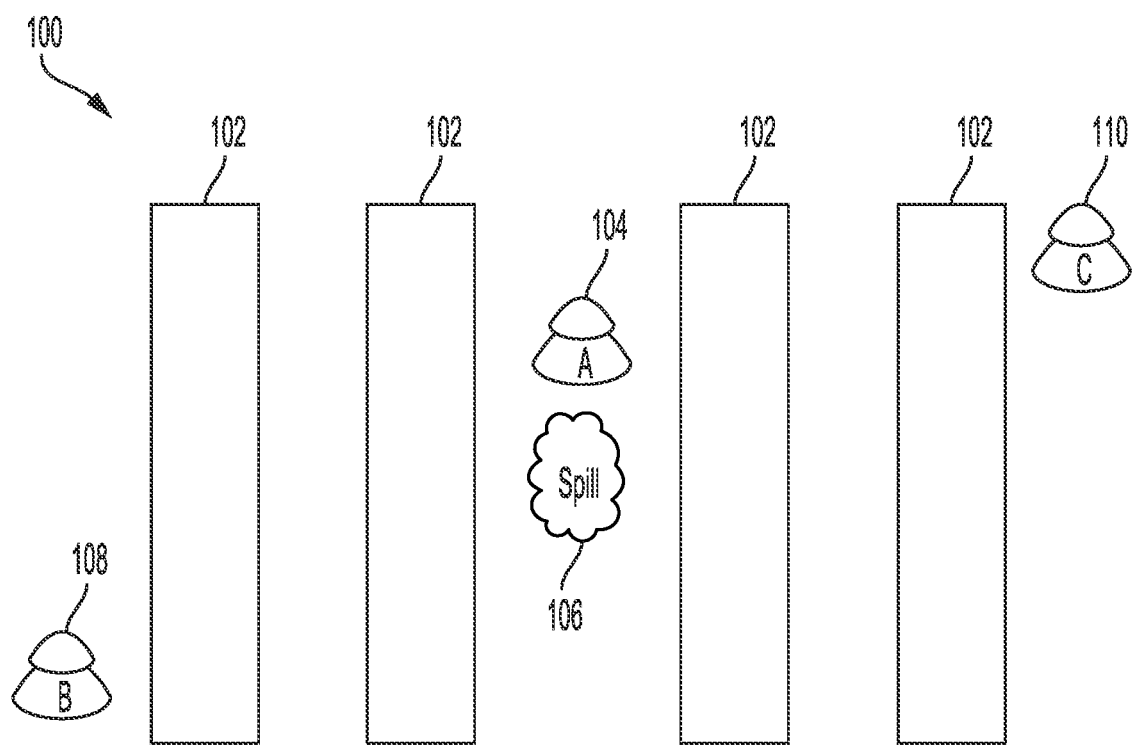
FIG. 1 illustrates an example of a robot in a store identifying a spill.

Various embodiments of the disclosure are described in detail below. While specific implementations are described, it should be understood that this is done for illustration purposes only. Other components and configurations may be used without parting from the spirit and scope of the disclosure.

The present disclosure addresses a task management system, and particularly a system for managing task distribution between various robots, drones, and autonomous vehicles. While various examples and embodiments may refer specifically to robots, drones, devices, or autonomous vehicles, the invention can be applied to all these categories. As tasks are identified as not capable of completion by the detecting robot, they are transmitted to a central task-management system which identifies a subset of robots which are capable of completing the task, determines the availability of the robots in the subset, and assigns one of those robots in the subset to complete the task.

Consider the following example. A store robot may be tasked with verifying current shelf inventories, and may also have a camera used for object avoidance when navigating store aisles. During the course of taking inventory, the inventory robot may detect the presence of liquid within the aisle. The inventory robot can classify the liquid as a spill and determine that the robot does not have the capability of cleaning the spill itself. To make this determination, the robot would, upon classifying the detected task into a task type, compare the task type of the detected task to the types of action the robot is capable of performing. With respect to store-specific tasks, other tasks which may need to be performed can include removing debris (such as glass, cardboard, dirt, or paper), cleaning a dirty floor, or ensuring that a planogram of the store is complied with. However, the types of tasks which can be identified are limitless. In this example, upon determining that the robot cannot clean up the spill itself, the inventory robot then reports the spill to a central task-management system and continues to perform its inventory duties (routing around the spill if necessary). In other configurations and examples, the detection robot may be capable of completing the task, but may be otherwise occupied or unable to complete the task. For example, the detection robot may be assigned another task which has greater urgency, may be low on power level to complete the identified task or to complete the identified task in addition to its assigned task, etc.

While in this example the task is detected using the object avoidance camera of the inventory robot, aspects of this invention can be performed even when the task is detected through other (non-robot based) mechanisms, such as human reporting (e.g., a human reports the spill using a networked device, such as a MC-40 or smartphone), a surveillance camera, a security camera, an odor detection device, etc. The information may be text-based (may require an NPL and OCR); audio-based (may require an NPL Image-based required image processing); machine-machine communication (may require an exchangeable code-language). In such cases, the information would be reported directly to the central task-management system without a detection robot first determining it could not complete the task. The central task-management system may analyze the information to identify if action is required and what the task is. Otherwise the processes described herein would be similar.

The central task-management system is a computer-based system, such as a computer server, which is capable of making determinations regarding the status of available robots and communicating with those robots. First, the central task-management system receives the task information, which may include information such as the location of the task and the type of task which needs to be performed. In some cases, the task information can include images/pictures, text describing the nature of the task, audio associated with the task, etc. The central task-management system may also analyze the received inputs, for example to identify the task (in some cases the robot may not be able to identify a task, just that an action may be required) or further refine the assignment. The central task-management system then proceeds to determine the best way to fulfill the task by assigning one or more robots to the task.

To determine the best way to fulfill the task, the central task-management system may identify, from a list of all robots currently within its control, those robots which would be capable of completing the task. For example, there may be three inventory robots, four cleaning robots, and two security robots under the central task-management system's control. If an inventory robot detects a spill, the central task-management system can select a subset (the cleaning robots) of the total robots available based on their capacity to perform the task.

The central task-management system can then determine the availability and/or performance capability of the robots within the subset. This can refer to determining if the robot is currently physically capable of performing the task, whereas the prior check can be based on robot configuration. In other words, this check on current availability identifies if the individual robots within the subset are sufficiently charged, functioning, serviced/maintained, have the necessary cleaning materials required for the task, etc. This check can also determine if the robots are already assigned tasks, or are otherwise engaged and incapable of performing the task at hand.

To make these determinations, the central task-management system may communicate with wireless requests to the individual robots. These requests can include a query for the current location of the individual robots, as well as a query regarding their current status (charge available, other assignments, etc.). The individual robots receive the requests and transmit responses back to the central task-management system.

The central task-management system receives these responses and can use the responses to select which robot will be assigned the task. In one example, the central task-management system has the location of the task to be completed based on the original information from the detecting robot, receives the current locations of the robots capable of completing the task, and assigns the robot which would have the shortest transit time to the task location. In other words, the central task-management system receives the responses from the various robots in the subset of capable robots, determines the respective transit times of each robot in the subset to the task location, ranks the robots based on those transit times, and selects the robot with the shortest transit time in that list.

In another example, the central task-management system may receive information from the subset of robots indicating that one robot is capable of completing the task, but would complete the task at a slower speed than other robots. In such an example, the slower robot may be ranked lower than other robots. If combined with transit time, the central task-management system may make the robot selection based on the total time to complete the task, whereas in other cases may make the robot selection based on transit time alone. In yet another example, a robot may report that it is closest to the task location and capable of completing the task, but would not have any charge remaining after the task is accomplished. The central task-management system may determine that it is more operationally efficient for the overall system for that particular robot to not be given the task (perhaps to go charge now) such that it can be available at a later time.

In some configurations, the central task-management system will "ping" the robots regarding their availability for every task received. The pings may be also sent at regular or irregular intervals. The robots may also automatically report their status to the central task-management system. A database may store the robots associated with the central task-management system, along with the respective capabilities of the robots which are associated with robot in a record.

In other configurations the central task-management system can implement efficiencies which result in increased speed in assigning tasks to the robots. Consider when two tasks are received within a time window. For the first task, the central task-management system may not have a record of where the capable robots are currently located and/or their availability, and may transmit requests to the robots regarding their availability. If the second task is received within a threshold amount of time of the first task, the central task-management system can use the first-task reports from the subset of capable robots to make the determination of which robot should be selected for the second task. That is, if robots "A" and "B" are capable and available of completing the first task and the central task-management system assigns robot "A" for the first task, when the second task is received shortly thereafter, the central task-management system can assign robot "B" without needing to ping the remaining robots. This can result in a faster determination of which robot will be assigned the task, and result in reduced power requirements (no longer requiring transmission of requests and responses).

The overall robot selection process used by the central task-management system can be modified overtime based on the responses of the robots, such that the robot selection process becomes more efficient in receiving tasks and assigning robots for the task completion. Specifically, the central task-management system can receive the responses, store the availability information received from the robots, store information about which robot was selected for the task, and store information about the task completion (such as actual time required to complete the task, did the robot fail in the task, was human intervention needed, etc.). The central task-management system can then identify a pattern in the data to modify future decision making in future iterations. For example, when a particular robot (or type of robot) consistently fails at a specific type of task, the central task-management system can self-modify its code to no longer assign that robot to those tasks. In this manner, the central task-management system can use iterative machine learning to become more efficient in the decision making process.

The disclosure now turns to the specific examples illustrated in the Figures. While specific examples are provided, elements of the examples can be removed, combined, and/or modified as required by a specific implementation.

FIG. 1 illustrates an example of a robot 104 in a store 100 identifying a spill 106. In this example, the store 100 has several rows of goods 102 separated by aisles. The detecting robot, robot A 104, has determined that it is incapable of cleaning up the spill 106. However, within the store 100 are two robots, robot B 108 and robot C 110, which may be capable of cleaning up the spill 106.

Figure 2:
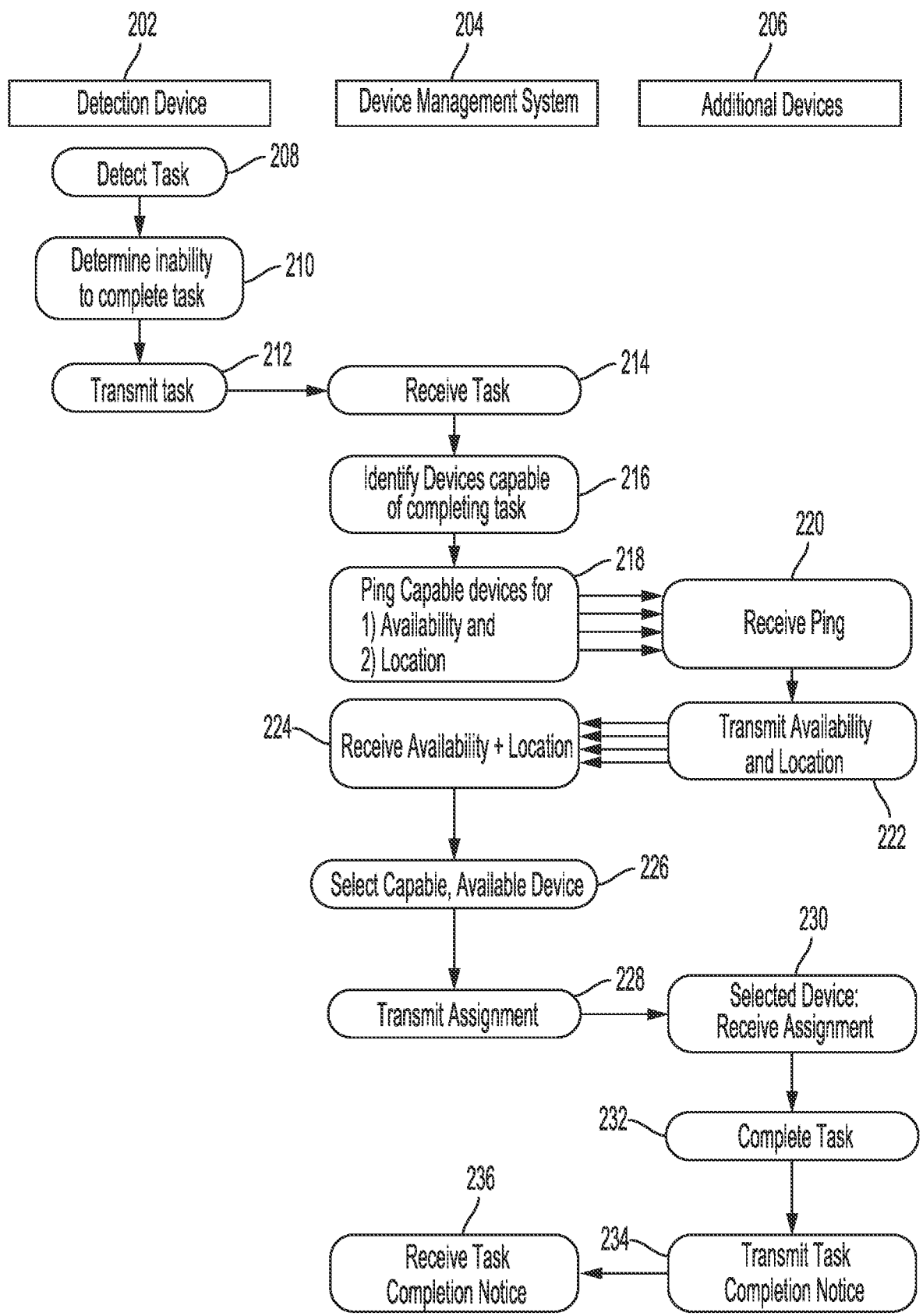
FIG. 2 illustrates an example of communications between distinct devices.

FIG. 2 illustrates an example of communications between distinct devices, or device categories. In this example, there are three devices: the detection device 202, the device management system 204, and the additional devices 206. The detection device 202 is the device which first detects the task 208. The detection device 202 determines that it is unable to complete the task 210 and transmits the task 212 and/or detected information to the device management system 204.

The device management system 204 receives the task 214 from the detection device 202 and identifies other devices capable of completing the task 216. This can be done using known information about the general capabilities of the various robots with which the device management system 204 communicates, or accessing similar information in a database electrically connected to the device management system 204. Upon identifying additional devices 206 capable of completing the task 216 (which may be a subset of all available devices in communication with the device management system 204) the device management system 204 pings 218 capable devices for (1) their current availability and (2) their current location.

The additional devices 206 receive the pings 220, then transmit their availability and location 222 and any other information to the device management system 204. The device management system 204 receives the availability and location information 224, then selects a capable, available device 226 based on the received information. Upon selecting a device, the device management system 204 transmits the task assignment 228 to the selected device. The selected device receives the assignment 230, completes the task 232, and transmits a task completion notice 234 back to the device management system 204. The device management system 204 receives the task completion notice 236, and the task is noted as completed.

Figure 3:
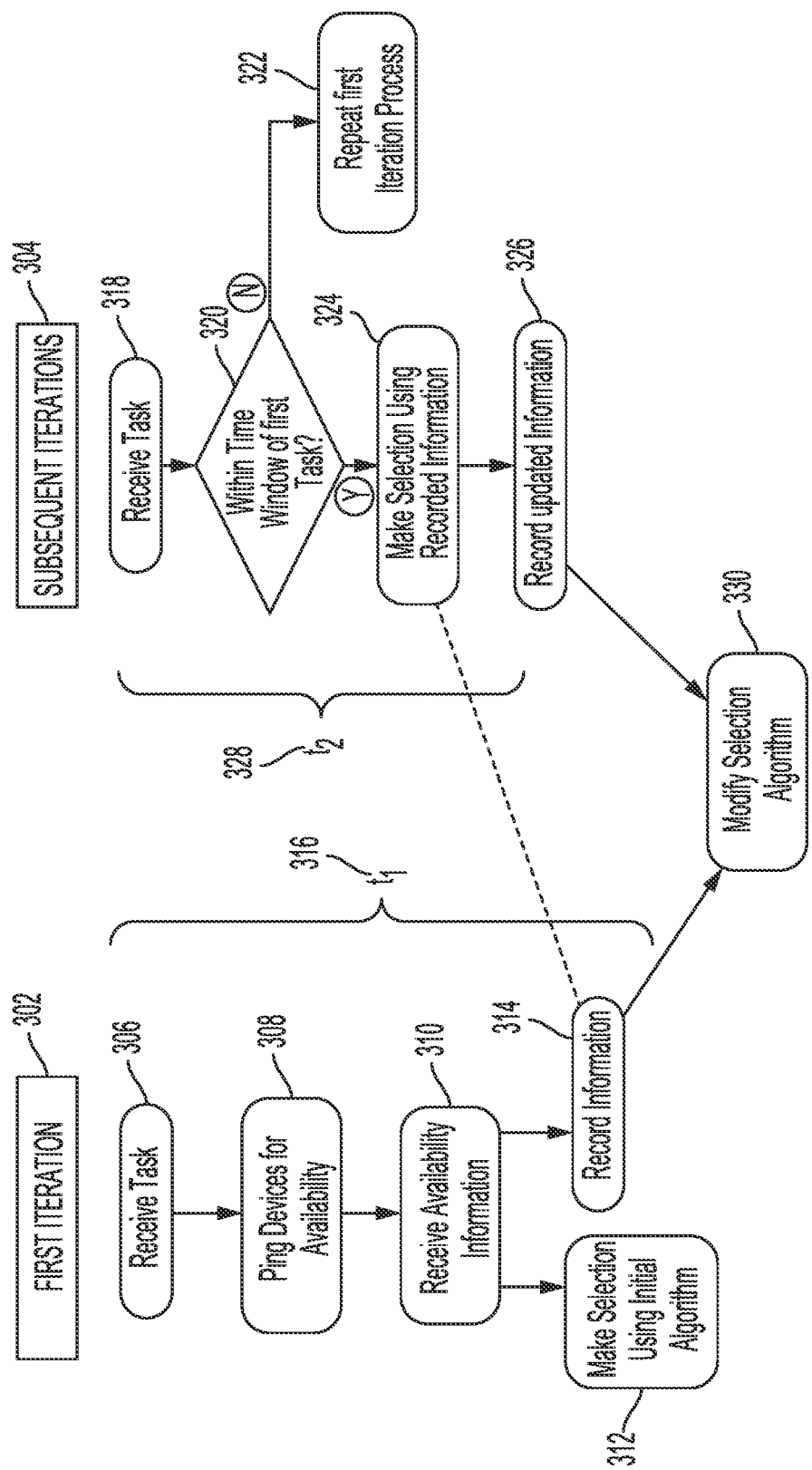
FIG. 3 illustrates exemplary iterations of the selection process.

FIG. 3 illustrates exemplary iterations of the selection process performed by the device management system 204. In a first iteration 302, a task is received 306, robots are pinged for availability information 310 (other information, such as location, may be requested as well), and the system makes a selection using an initial algorithm 312. In addition, in this configuration, the information received from the various pinged robots is recorded 314 for use in future iterations. The total time to make the selection is illustrated as $t_1$ 316. During subsequent iterations 304, the system can receive a task 318, then determine if the new task was received within a time window of the first task 306. If outside the time window, the system will repeat the first iteration process 302. However, if within the time window, the system can make the selection of a robot using the recorded information 424 recorded 314 during the first iteration 302. Additional data may then be recorded 326 and relied upon in future iterations. The total time for the second/subsequent iterations is illustrated as $t_2$ 328, which is illustrated as smaller than $t_1$ 316 because the subsequent iterations 304 can be processed faster than the first iteration 302.

In addition, the recorded data about each iteration can be used to modify the selection algorithm. For example, the weights assigned to various factors (availability, location, task proficiency, overall system capacity) may change based on the selections and patterns made by the system. To modify the selection algorithm can require modifications to code and/or processor configurations. That is, if the algorithm is being executed by a processor from memory, modification of the algorithm can require overwriting the memory with the new, more efficient code. If the algorithm is encoded into a processor such as an FPGA (Field-Programmable Gate Array), modification of the algorithm can require a modification to the modifiable processor itself.

FIG. 4 illustrates an exemplary method embodiment of the present invention. In this example, the system receives, from a first autonomous vehicle a task assignment which the first autonomous vehicle is incapable of performing (402). An example of the task is a cleaning task, such as vacuuming, sweeping, mopping, and disinfecting. Other exemplary tasks may include placing or removing items, taking photographs, detecting specific signals, etc. In one configuration, the task assignment can include: a task location identifying a location of the task assignment, and a task type identifying an action which needs to be performed for completion of the task assignment.

The system identifies, via a processor, a subset of autonomous vehicles within a plurality of autonomous vehicles, the subset of autonomous vehicles being capable of completing the task assignment (404) and transmits a request to each autonomous vehicle in the subset of autonomous vehicles (406). In one example, the request can include a location query regarding a current location of each autonomous vehicle in the subset of autonomous vehicles, and a status query regarding a current availability of each autonomous vehicle in the subset of autonomous vehicles. In such configurations, upon receiving the responses of the subset, the selecting can occur by: identifying, based on the current availability of each autonomous vehicle in the subset of autonomous vehicles, available autonomous vehicles capable of completing the task assignment; determining a travel time required for each of the available autonomous vehicles from the current location of each respective autonomous vehicle in the available autonomous vehicles to the location of the task assignment, to yield travel times of the available autonomous vehicles; ranking the available autonomous vehicles based on the travel times of the available autonomous vehicles, to yield ranked available autonomous vehicles; and selecting a fastest time within the ranked available autonomous vehicles as the selected autonomous vehicle.

The system receives at least one response to the request from at least a portion of the subset of autonomous vehicles (408) and selects, via the processor and based on the at least one response, a selected autonomous vehicle from the subset of autonomous vehicles (410). The system then transmits the task assignment to the selected autonomous vehicle for completion (412).

In one configuration, the transmitting of the request, the receiving of the at least one response, and the transmitting of the task assignment occur using a wireless communication system.

In one configuration, the method can be further augmented to include: recording the at least one response to the request, to yield recorded data; and modifying a selection process used for the selecting of the selected autonomous vehicle for a subsequent task iteration based on the recorded data.

With reference to FIG. 5, an exemplary system includes a general-purpose computing device 500, including a processing unit (CPU or processor) 520 and a system bus 510 that couples various system components including the system memory 530 such as read-only memory (ROM) 540 and random access memory (RAM) 550 to the processor 520. The system 500 can include a cache of high-speed memory connected directly with, in close proximity to, or integrated as part of the processor 520. The system 500 copies data from the memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide nonvolatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 520, bus 510, display 570, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 500 is a small, handheld computing device, a desktop computer, or a computer server.

Although the exemplary embodiment described herein employs the hard disk 560, other types of computer-readable media which can store data that are accessible by a computer, such as magnetic cassettes, flash memory cards, digital versatile disks, cartridges, random access memories (RAMs) 550, and read-only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

The steps outlined herein are exemplary and can be implemented in any combination thereof, including combinations that exclude, add, or modify certain steps.

Use of language such as "at least one of X, Y, and Z" or "at least one or more of X, Y, or Z" are intended to convey a single item (just X, or just Y, or just Z) or multiple items (i.e., {X and Y}, {Y and Z}, or {X, Y, and Z}). "At least one of" is not intended to convey a requirement that each possible item must be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
    while a first autonomous vehicle is performing one or more activities of an assigned first task assignment associated with a store, receiving, by a processor and from the first autonomous vehicle a second task assignment associated with the store which the first autonomous vehicle is incapable of performing, the second task assignment including one or more activities;
    identifying, by the processor, a subset of autonomous vehicles within a plurality of autonomous vehicles, the subset of autonomous vehicles being capable of completing the second task assignment;
    transmitting, by the processor, a request to each autonomous vehicle in the subset of autonomous vehicles;
    receiving, by the processor, at least one response to the request from at least a portion of the subset of autonomous vehicles;
    selecting, by the processor and based on the at least one response, a selected autonomous vehicle from the subset of autonomous vehicles to complete the second task assignment; and
    transmitting, by the processor and to the selected autonomous vehicle, one or more instructions associated with the second task assignment, the one or more instructions causing the selected autonomous vehicle to perform the one or more activities of the second task assignment.

2. The method of claim 1, wherein the second task assignment is a cleaning task.

3. The method of claim 2, wherein the cleaning task is one of vacuuming, sweeping, mopping, and disinfecting.

4. The method of claim 1, wherein the transmitting of the request, the receiving of the at least one response, and the transmitting of the one or more instructions associated with the second task assignment occur using a wireless communication system.

5. The method of claim 1, wherein the second task assignment comprises:
    a task location identifying a location of the second task assignment; and
    a task type identifying the one or more activities which needs to be performed for completion of the second task assignment.

6. The method of claim 5, wherein the request comprises:
    a location query regarding a current location of each autonomous vehicle in the subset of autonomous vehicles; and
    a status query regarding a current availability of each autonomous vehicle in the subset of autonomous vehicles.

7. The method of claim 6, wherein the selecting comprises:
    identifying, based on the current availability of each autonomous vehicle in the subset of autonomous vehicles, available autonomous vehicles capable of completing the second task assignment associated with the store;
    determining a travel time required for each of the available autonomous vehicles from the current location of each respective autonomous vehicle in the available autonomous vehicles to the location of the second task assignment, to yield travel times of the available autonomous vehicles;
    ranking the available autonomous vehicles based on the travel times of the available autonomous vehicles, to yield ranked available autonomous vehicles; and
    selecting a fastest time within the ranked available autonomous vehicles as the selected autonomous vehicle to complete the second task assignment.

8. The method of claim 1, further comprising:
    recording the at least one response to the request, to yield recorded data; and
    modifying a selection process used for the selecting of the selected autonomous vehicle for a subsequent task iteration based on the recorded data.

9. A system comprising:
    a processor; and
    a computer-readable storage medium having instructions stored which, when executed by the processor, cause the processor to perform operations comprising:
        while a first autonomous vehicle is performing one or more activities of an assigned first task assignment associated with a store, receiving, from the first autonomous vehicle a second task assignment associated with the store which the first autonomous vehicle is incapable of performing, the second task assignment including one or more activities;
        identifying a subset of autonomous vehicles within a plurality of autonomous vehicles, the subset of autonomous vehicles being capable of completing the second task assignment;
        transmitting a request to each autonomous vehicle in the subset of autonomous vehicles;
        receiving at least one response to the request from at least a portion of the subset of autonomous vehicles;
        selecting, based on the at least one response, a selected autonomous vehicle from the subset of autonomous vehicles to complete the second task assignment; and
        transmitting, to the selected autonomous vehicle, one or more instructions associated with the second task assignment, the one or more instructions causing the selected autonomous vehicle to perform the one or more activities of the second task assignment.

10. The system of claim 9, wherein the second task assignment is a cleaning task.

11. The system of claim 10, wherein the cleaning task is one of vacuuming, sweeping, mopping, and disinfecting.

12. The system of claim 9, wherein the transmitting of the request, the receiving of the at least one response, and the transmitting of the one or more instructions associated with the second task assignment occur using a wireless communication system.

13. The system of claim 9, wherein the second task assignment comprises:
    a task location identifying a location of the second task assignment; and
    a task type identifying the one or more activities which needs to be performed for completion of the second task assignment.

14. The system of claim 13, wherein the request comprises:
    a location query regarding a current location of each autonomous vehicle in the subset of autonomous vehicles; and
    a status query regarding a current availability of each autonomous vehicle in the subset of autonomous vehicles.

15. The system of claim 14, wherein the selecting comprises:
identifying, based on the current availability of each autonomous vehicle in the subset of autonomous vehicles, available autonomous vehicles capable of completing the second task assignment associated with the store;
determining a travel time required for each of the available autonomous vehicles from the current location of each respective autonomous vehicle in the available autonomous vehicles to the location of the second task assignment, to yield travel times of the available autonomous vehicles;
ranking the available autonomous vehicles based on the travel times of the available autonomous vehicles, to yield ranked available autonomous vehicles; and
selecting a fastest time within the ranked available autonomous vehicles as the selected autonomous vehicle to complete the second task assignment.

16. The system of claim 9, the computer-readable storage medium having additional instructions stored which, when executed by the processor, cause the processor to perform operations comprising:
recording the at least one response to the request, to yield recorded data; and
modifying a selection process used for the selecting of the selected autonomous vehicle for a subsequent task iteration based on the recorded data.

17. A non-transitory computer-readable storage medium having instructions stored which, when executed by a computing device, cause the computing device to perform operations comprising:
while a first autonomous vehicle is performing one or more activities of an assigned first task assignment associated with a store, receiving, from a first autonomous vehicle a second task assignment associated with the store which the first autonomous vehicle is incapable of performing, the second task assignment including one or more activities;
identifying a subset of autonomous vehicles within a plurality of autonomous vehicles, the subset of autonomous vehicles being capable of completing the second task assignment;
transmitting a request to each autonomous vehicle in the subset of autonomous vehicles;
receiving at least one response to the request from at least a portion of the subset of autonomous vehicles;
selecting, based on the at least one response, a selected autonomous vehicle from the subset of autonomous vehicles to complete the second task assignment; and
transmitting, to the selected autonomous vehicle, one or more instructions associated with the second task assignment, the one or more instructions causing the selected autonomous vehicle to perform the one or more activities of the second task assignment.

18. The non-transitory computer-readable storage medium of claim 17, wherein the second task assignment is a cleaning task.

19. The non-transitory computer-readable storage medium of claim 18, wherein the cleaning task is one of vacuuming, sweeping, mopping, and disinfecting.

20. The non-transitory computer-readable storage medium of claim 17, wherein the transmitting of the request, the receiving of the at least one response, and the transmitting of the second task assignment occur using a wireless communication system.

* * * * *